US010483676B2

(12) United States Patent
Peng et al.

(10) Patent No.: US 10,483,676 B2
(45) Date of Patent: Nov. 19, 2019

(54) ELECTRICAL CONNECTOR WITH A LATCH STRUCTURE

(71) Applicant: F TIME TECHNOLOGY INDUSTRIAL CO., LTD., New Taipei (TW)

(72) Inventors: Chang-Lin Peng, New Taipei (TW); Xin-Fu Liu, New Taipei (TW); Yen-Hua Huang, New Taipei (TW); Chih-Hsuan Tung, New Taipei (TW)

(73) Assignee: F TIME TECHNOLOGY INDUSTRIAL CO., LTD., New Taipei (TW)

( * ) Notice: Subject to any disclaimer, the term of this patent is extended or adjusted under 35 U.S.C. 154(b) by 0 days.

(21) Appl. No.: 16/249,762

(22) Filed: Jan. 16, 2019

(65) Prior Publication Data

US 2019/0229453 A1 Jul. 25, 2019

(30) Foreign Application Priority Data

Jan. 19, 2018 (TW) .............................. 107101937 A

(51) Int. Cl.
*H02B 1/01* (2006.01)
*H01R 13/426* (2006.01)

(52) U.S. Cl.
CPC .................................. *H01R 13/426* (2013.01)

(58) Field of Classification Search
CPC .. H01R 13/743; H01R 23/7026; H01R 33/46; H01R 33/08; H01R 33/09
USPC ......................... 439/557, 567, 336, 226, 558
See application file for complete search history.

(56) References Cited

U.S. PATENT DOCUMENTS

| | | | | |
|---|---|---|---|---|
| 6,527,578 B2 * | 3/2003 | Kashiyama | H01R 13/641 | 439/352 |
| 7,044,762 B1 * | 5/2006 | Hong | H01R 13/5213 | 439/275 |
| 7,048,570 B2 * | 5/2006 | Kubo | H01R 13/6273 | 439/357 |
| 2008/0139034 A1 * | 6/2008 | Dieterle | H01R 13/6272 | 439/352 |
| 2010/0323556 A1 * | 12/2010 | Lee | H01R 13/743 | 439/567 |

* cited by examiner

*Primary Examiner* — Phuong Chi Thi Nguyen
(74) *Attorney, Agent, or Firm* — Guice Patents PLLC

(57) ABSTRACT

An electrical connector includes a housing having insertion slots extended through opposing front and rear sides thereof, an engagement groove and a locating groove located on each of two opposite lateral sides thereof and an opening located in each locating groove in communication with one respective insertion slot, a plurality of conductive components respectively inserted into the insertion slots, each conductive component having a locating groove extended around the periphery thereof, and two latches each having a ring hook hooked in one respective engagement groove, a latch plate engaged into respective locating groove and a curved engagement surface located on the latch plate and inserted into one respective opening to engage the locating groove of one respective conductive component.

6 Claims, 5 Drawing Sheets

ELECTRICAL CONNECTOR WITH A LATCH STRUCTURE

BACKGROUND OF THE INVENTION

1. Field of the Invention

The present invention relates to electrical connector technology and more particularly, to an electrical connector with a latch structure that uses latches to hold down the conductive components.

2. Description of the Related Art

With the continuous updating of technology, various new electronic products have been introduced. Many electronic products are connected to other electronic devices by cables with the use of mating male and female connectors to achieve signal transmission.

FIG. 1 illustrates an electrical connector according to the prior art. According to this design, the electrical connector comprises a housing 100, and a conductive component 101 mounted in the housing 100 for the connection of a mating connector. According to this design, the conductive component 101 is directly inserted into the housing 100 and secured in the housing 100 by an internal structure of the housing 100.

However, the demand for technology continues to increase, and the demand for electronic signal transmission is constantly changing. In electronic signal transmission, it is necessary to maintain signal stability and signal fluency. However, in the aforesaid prior art electrical connector design, the conductive component 101 can be forced to deviate when a series connection is performed, thereby affecting signal stability and signal fluency.

SUMMARY OF THE INVENTION

The present invention has been accomplished under the circumstances in view. It is the main object of the present invention to provide an electrical connector with a latch structure, which uses latches to hold down the conductive components therein, enhancing the positioning stability of the conductive components.

To achieve this and other objects of the present invention, an electrical connector comprises a housing, two latches and at least one conductive component. The housing comprises at least one insertion slot extended through opposing front and rear sides thereof, an engagement groove located on each of two opposite lateral sides thereof and extended to opposing top and bottom sides thereof, a locating groove located on each of the two opposite lateral sides and at least one opening located in each locating groove in communication with one respective insertion slot. The two latches are respectively and detachably attached to the two opposite lateral sides of the housing, each comprising a ring hook hooked in one respective engagement groove and a latch plate engaged into respective locating groove. The latch plate has at least one curved engagement surface respectively engaged into one respective opening and one respective insertion slot. The at least one conductive component is respectively inserted into the at least one insertion slot, each comprising a conducting connector located at a front end thereof and a locating groove extended around the periphery thereof and engaged by one respective curved engagement surface of one respective latch plate.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
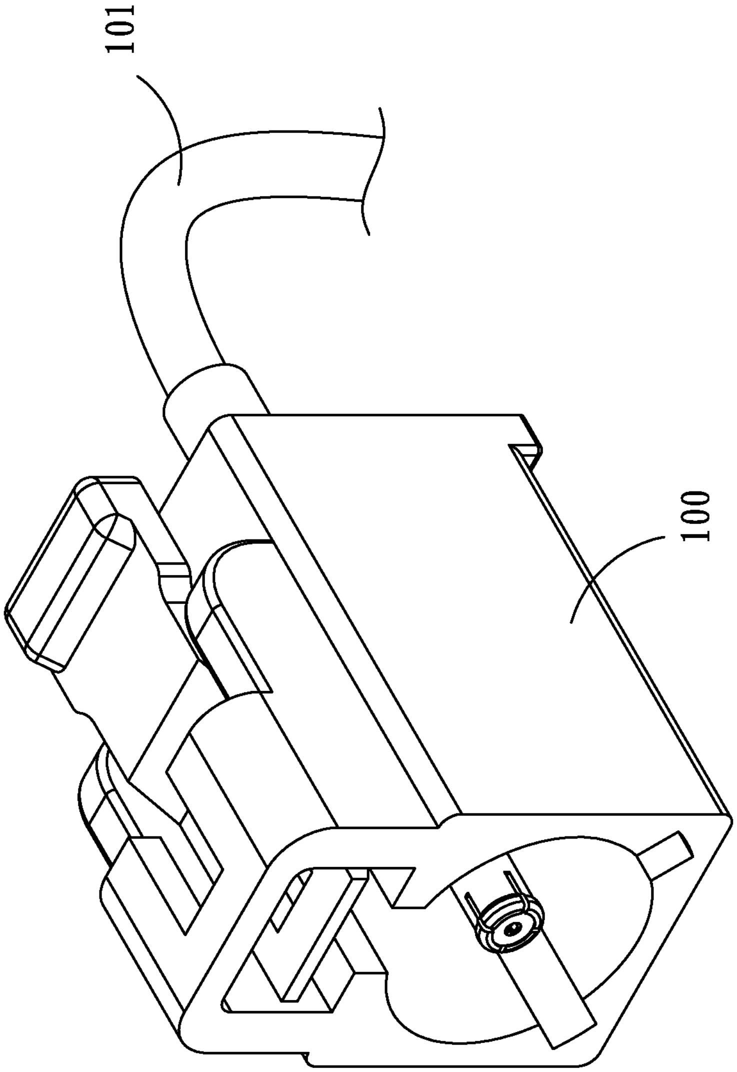
FIG. 1 Prior Art
FIG. 1 is an oblique top elevational view of an electrical connector according to the prior art.
Figure 2:
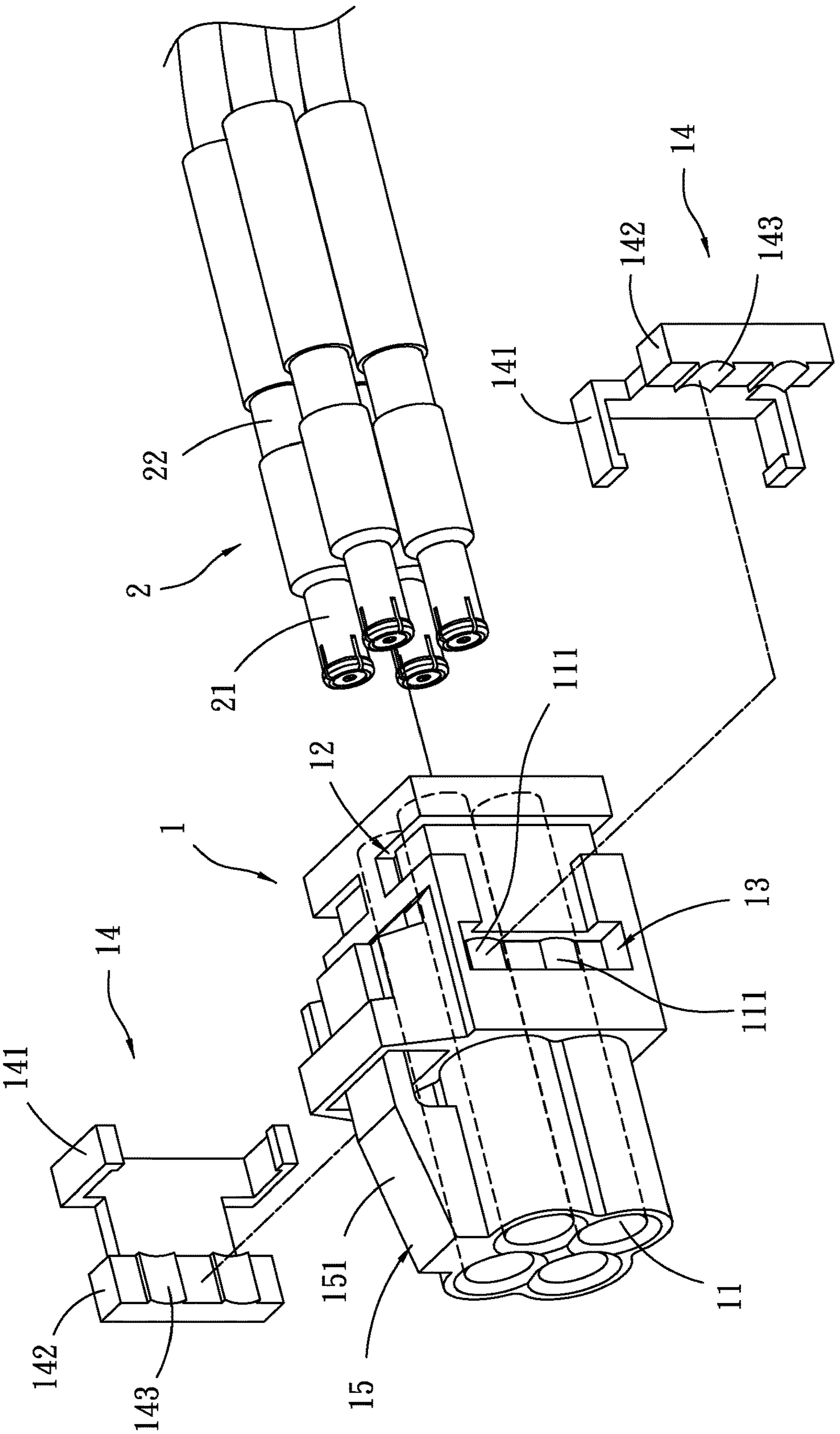
FIG. 2 is exploded view of an electrical connector with a latch structure in accordance with the present invention.

Referring to FIG. 2, an electrical connector in accordance with the present invention is shown. The electrical connector comprises a housing 1, and at least one conductive component 2. The housing 1 has at least one insertion slot 11 extending through opposing front and rear sides thereof. In this embodiment, the housing 1 is a multi-core electrical connector housing having a plurality of insertion slots 11. These insertion slots 11 have a circular cross section. The housing 1 further has an engagement groove 12 located on each of two opposing lateral sides thereof and extended to opposing top and bottom sides thereof, a locating groove 13 located on each of the two opposite lateral sides, and at least one, for example, two openings 111 located in each locating groove 13 in communication with one respective insertion slot 11.

Referring to FIG. 2 again, the electrical connector further comprises a plurality of, for example, two latches 14 respectively attached to the two opposite lateral sides of the housing 1 to hold down the at least one conductive component 2 in the housing 1. Each latch 14 comprises a ring hook 141 and a latch plate 142. In this embodiment, the ring hook 141 and the latch plate 142 are formed integral with each other. The ring hook 141 has a U-shaped profile hooked in the engagement groove 12 at one lateral side of the housing 1. The latch plate 142 is mounted in the locating groove 13 at the same lateral side of the housing 1, having at least one, for example, two curved engagement surfaces 143 corresponding to the two openings 111 in the corresponding insertion slot 11. The housing further 1 has a clip 15 at a top side thereof. The clip 15 has an inclined surface 151.

Figure 3:
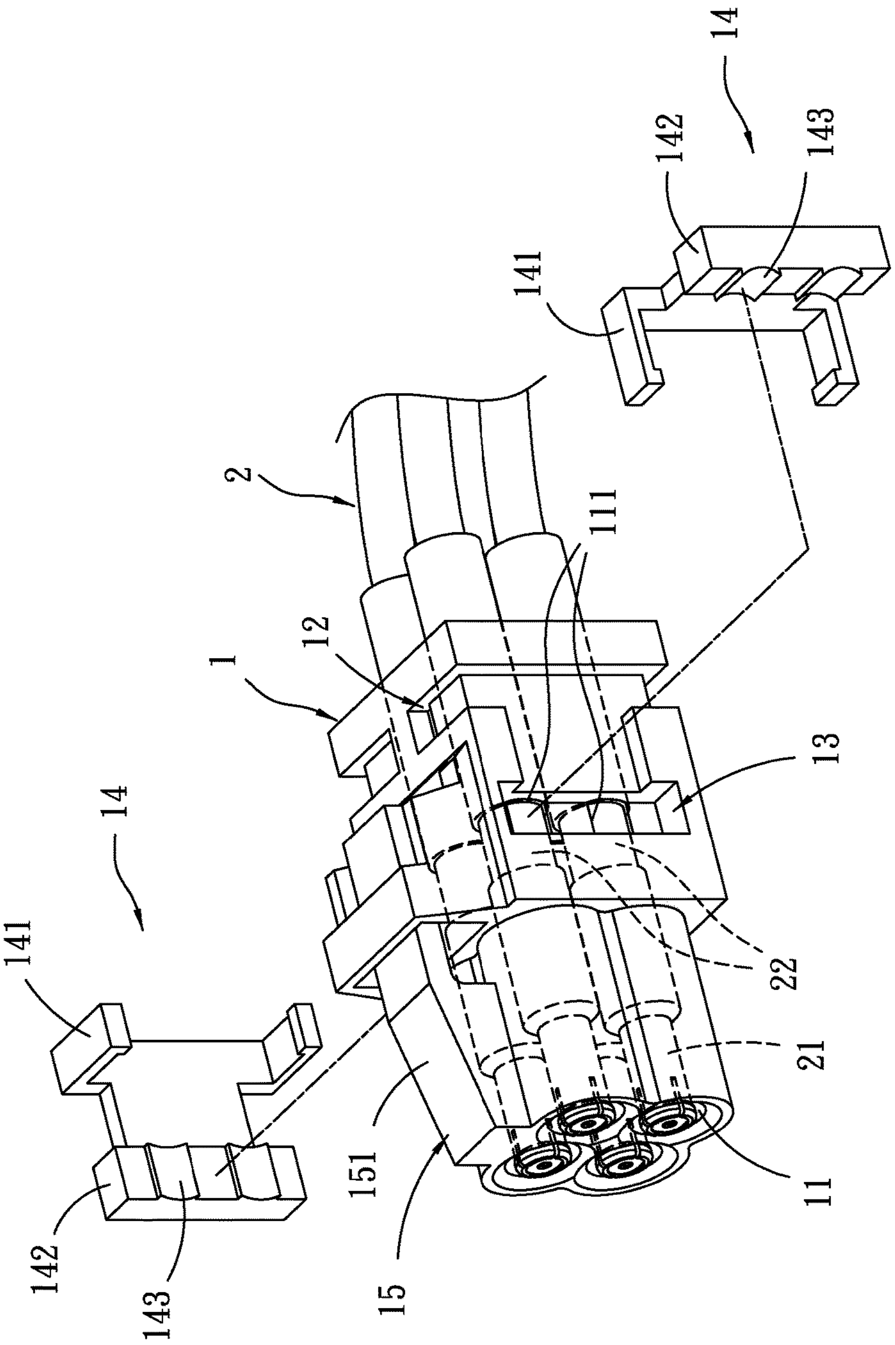
FIG. 3 corresponds to FIG. 2, illustrating the conductive components inserted into the housing.
Figure 4:
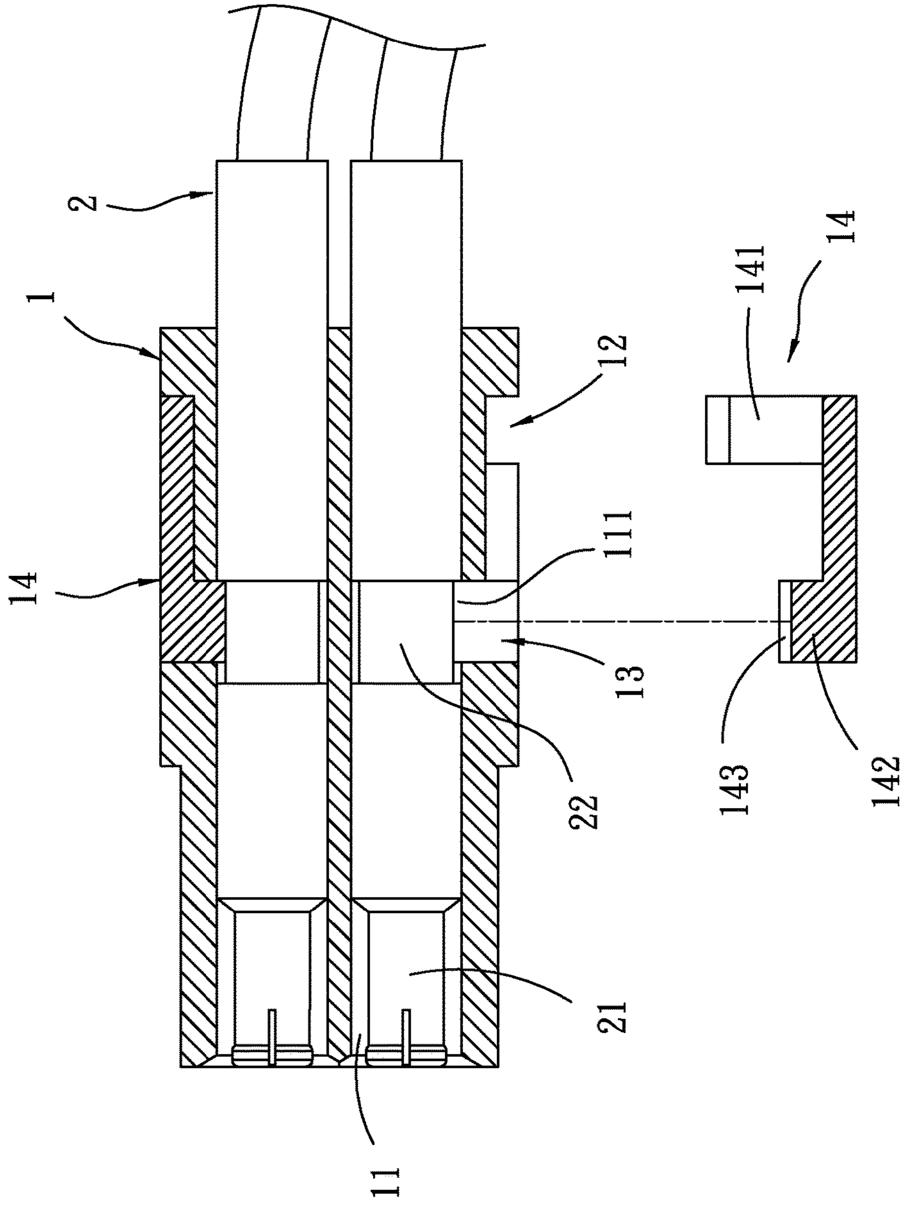
FIG. 4 is a sectional top view of the present invention, illustrating the conductive components inserted into the housing and one latch fastened to one lateral side of the housing.
Figure 5:
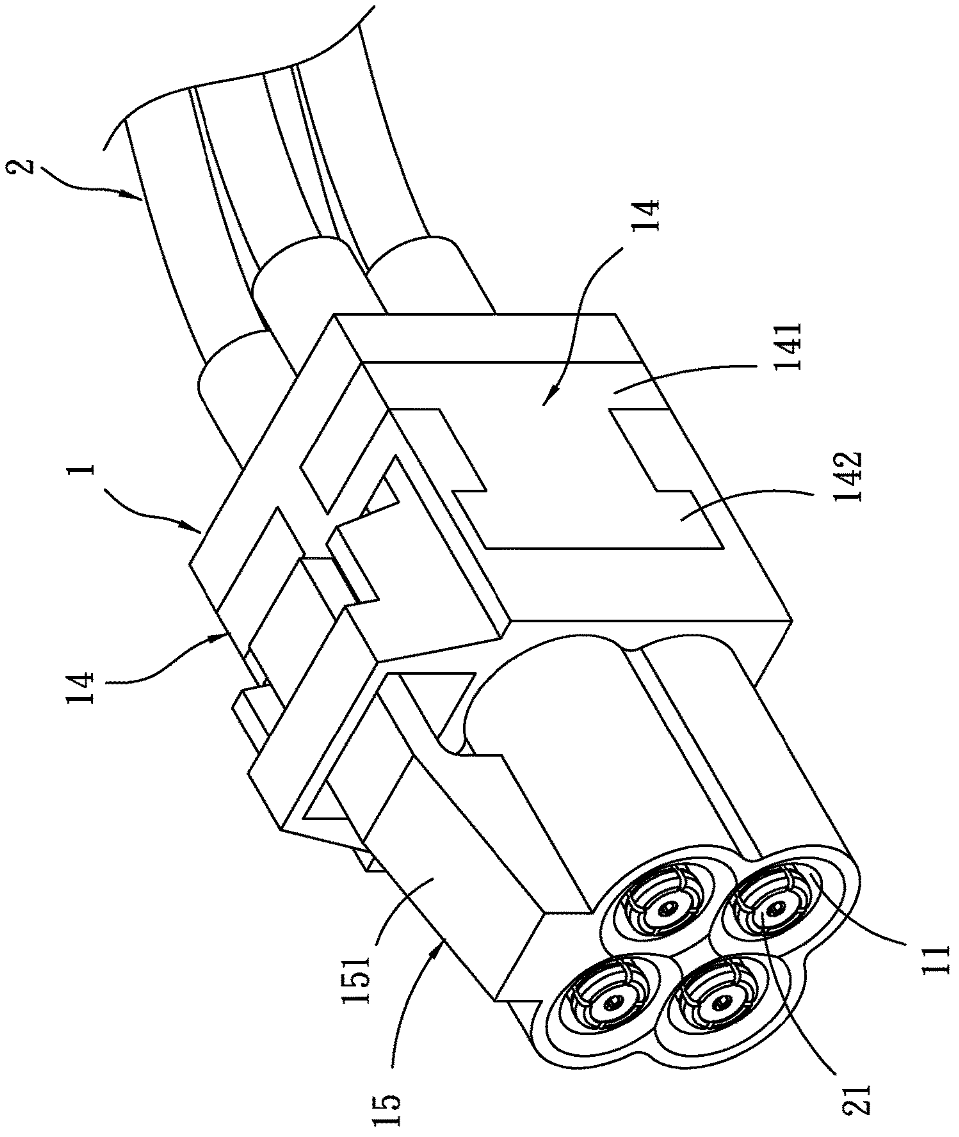
FIG. 5 is an oblique top elevational assembly view of the present invention.

Referring to FIG. 2 again, in this embodiment, the number of the at least one conductive component 2 is 4. These conductive components 2 are respectively inserted into the insertion slots 11. Each conductive component 2 has a conducting connector 21 at a front end thereof, and a locating groove 22 extended around the periphery thereof. As illustrated in FIG. 3, after insertion of the conductive components 2 in the respective insertion slots 11, the locating grooves 22 of the conductive components 2 are respectively aimed at the openings 111. As illustrated in FIG. 4, when the latches 14 are respectively attached to the engagement grooves 12 and locating grooves 13 of the housing 1, the curved engagement surfaces 143 of the latches 14 are respectively forced into engagement with the locating grooves 22 of the respective conductive components 2 to lock the conductive components 2 in the housing 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electrical connector, comprising:

a housing comprising at least one insertion slot extended through opposing front and rear sides thereof, an engagement groove located on each of two opposite lateral sides thereof and extended to opposing top and bottom sides thereof, a locating groove located on each of said two opposite lateral sides and at least one opening located in each said locating groove in communication with one respective said insertion slot;

two latches respectively and detachably attached to the two opposite lateral sides of said housing, each said latch comprising a ring hook hooked in one respective said engagement groove and a latch plate engaged into respective said locating groove, said latch plate having at least one curved engagement surface respectively engaged into one respective said opening and one respective said insertion slot; and at least one conductive component respectively inserted into said at least one insertion slot, each said conductive component comprising a conducting connector located at a front end thereof and a locating groove extended around the periphery thereof and engaged by one respective said curved engagement surface of one respective said latch plate.

2. The electrical connector as claimed in claim 1, wherein said housing is a multi-core connector housing.

3. The electrical connector as claimed in claim 1, wherein each said insertion slot of said housing has a circular cross section.

4. The electrical connector as claimed in claim 1, wherein said ring hook and said latch plate are formed integral with each other.

5. The electrical connector as claimed in claim 1, wherein said ring hook has a U-shaped profile.

6. The electrical connector as claimed in claim 1, wherein said housing further comprises a clip at a top side thereof, said clip having an inclined surface.

* * * * *